United States Patent
Bitton et al.

(10) Patent No.: US 8,982,748 B2
(45) Date of Patent: Mar. 17, 2015

(54) ANTENNA ARRANGEMENT AND MOBILE COMMUNICATION DEVICE USING SAME

(75) Inventors: Gabriel Bitton, Rishon Letzion (IL); David Moallem, Ramat-Gan (IL); Assaf Oren, Reshon Letzion (IL); Roni Shamsian, Holon (IL)

(73) Assignee: Motorola Solutions, Inc., Schaumburg, IL (US)

( * ) Notice: Subject to any disclaimer, the term of this patent is extended or adjusted under 35 U.S.C. 154(b) by 264 days.

(21) Appl. No.: 13/464,355

(22) Filed: May 4, 2012

(65) Prior Publication Data

US 2013/0294301 A1 Nov. 7, 2013

(51) Int. Cl.
*H04L 5/00* (2006.01)
*H04L 5/06* (2006.01)
*H04B 7/06* (2006.01)

(52) U.S. Cl.
CPC ............... *H04L 5/06* (2013.01); *H04B 7/0691* (2013.01)
USPC ............................................................. 370/297

(58) Field of Classification Search
CPC ........... H04L 5/14; H04L 5/1423; H04L 5/16; H04L 5/08; H04L 5/06
USPC ................. 370/275, 276, 277, 278, 282, 297; 455/73, 90.2
See application file for complete search history.

(56) References Cited

U.S. PATENT DOCUMENTS

| | | | |
|---|---|---|---|
| 6,119,003 A | 9/2000 | Kukkohovi | |
| 6,351,628 B1 | 2/2002 | Leizerovich et al. | |
| 8,170,604 B2 | 5/2012 | Uehara et al. | |
| 8,195,156 B2 | 6/2012 | Dunn et al. | |
| 2003/0045322 A1* | 3/2003 | Baer et al. | 455/527 |
| 2004/0132488 A1 | 7/2004 | Hidehiro et al. | |
| 2006/0087975 A1* | 4/2006 | Zheng et al. | 370/241 |
| 2006/0116182 A1 | 6/2006 | Bekritsky | |
| 2007/0218845 A1* | 9/2007 | Efland et al. | 455/84 |
| 2008/0146163 A1 | 6/2008 | Korneluk et al. | |
| 2008/0254747 A1* | 10/2008 | Fu et al. | 455/66.1 |
| 2009/0264086 A1* | 10/2009 | Song et al. | 455/90.2 |
| 2010/0090777 A1* | 4/2010 | Song et al. | 333/101 |
| 2010/0099412 A1 | 4/2010 | Ramachandran et al. | |
| 2010/0157855 A1 | 6/2010 | Chu et al. | |

(Continued)

FOREIGN PATENT DOCUMENTS

| | | |
|---|---|---|
| KR | 20090008232 A | 1/2009 |
| WO | 2008109995 A1 | 9/2008 |
| WO | 2013029568 A1 | 3/2013 |

OTHER PUBLICATIONS

International Search Report and Written Opinion for International Patent Application No. PCT/US2013/036633 mailed Jul. 8, 2013.

*Primary Examiner* — Ricky Ngo
*Assistant Examiner* — Kabir Jahangir
(74) *Attorney, Agent, or Firm* — Steven May (57) ABSTRACT

An antenna arrangement (200) and communication device (500) using the antenna arrangement connect a plurality of transceivers (302, 304) to a plurality of antenna elements (314, 316) and switches connections between the transceivers and the antenna elements depending on which transceiver has primary transmit control. The antenna elements include a transmit antenna element (316) and a monitoring antenna element (314). The transceiver having primary transmit control is connected to the transmit antenna element and the transceiver not having primary transmit control is connected to the monitoring antenna element.

12 Claims, 4 Drawing Sheets

(56) References Cited

U.S. PATENT DOCUMENTS

| | | | |
|---|---|---|---|
| 2010/0233965 A1* | 9/2010 | Fukuoka | 455/67.11 |
| 2011/0053527 A1* | 3/2011 | Hunzinger | 455/101 |
| 2012/0039325 A1 | 2/2012 | Buckley et al. | |
| 2012/0282875 A1* | 11/2012 | Park et al. | 455/404.1 |

* cited by examiner

ANTENNA ARRANGEMENT AND MOBILE COMMUNICATION DEVICE USING SAME

FIELD OF THE DISCLOSURE

The present disclosure relates generally to antenna systems, and more particularly to antenna arrangements for mobile communication devices that operate on more than one mobile communication air interface at a time.

BACKGROUND

There are a number of different mobile radio communication systems commonly in use, and consumers typically chose to subscribe to one that provides service in their location or region. Each system uses a particular, and typically standardized, air interface that specifies radio operation such as signal timing, frequency, modulation, and other aspects of radio operation. Different systems in a given region can each use a different air interface. Although multi-mode communication devices have been made that can access more than one type of air interface, communication devices are more commonly designed to operate using only one air interface. One reason communication devices are typically single mode devices is that a multi-mode device requires more hardware to facilitate multi-mode operation, and consumers generally prefer smaller devices. Advances in circuit integration have somewhat alleviated the size issue. However, another reason multi-mode devices have not gained in popularity is that they typically operate on only one air interface at a time, and the user has to select and switch between air interfaces because operation on more than one air interface at a time can result in the device exceeding regulated specific absorption rate (SAR) levels set by various national and international agencies. As a result, a multi-mode device ends up operating effectively as a single mode device, but one that can be reconfigured to operate on different air interfaces.

Accordingly, there is a need for a means by which a multi-mode communication device can operate on more than one air interface at a time without exceeding regulated SAR levels.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments disclosed herein include an antenna arrangement, suitable for use with, among others, multi-mode mobile communication devices. Embodiments of the disclosed antenna arrangement include first and second transceivers that are each configured to operate according to different first and second air interfaces, respectively. Only one of the first and second transceivers can have primary transmit control at a time. A receive diversity antenna element is coupled to both the first and second transceivers. The antenna arrangement also includes a transmit antenna element and a monitoring antenna element. A switching circuit selectively couples the first and second transceivers to the transmit antenna element and the monitoring antenna element. When the first transceiver has primary transmit control the switching circuit couples the first transceiver to the transmit antenna and the second transceiver to the monitoring antenna. When the second transceiver has primary transmit control the switching circuit couples the second transceiver to the transmit antenna and the first transceiver to the monitoring antenna.

Figure 1:
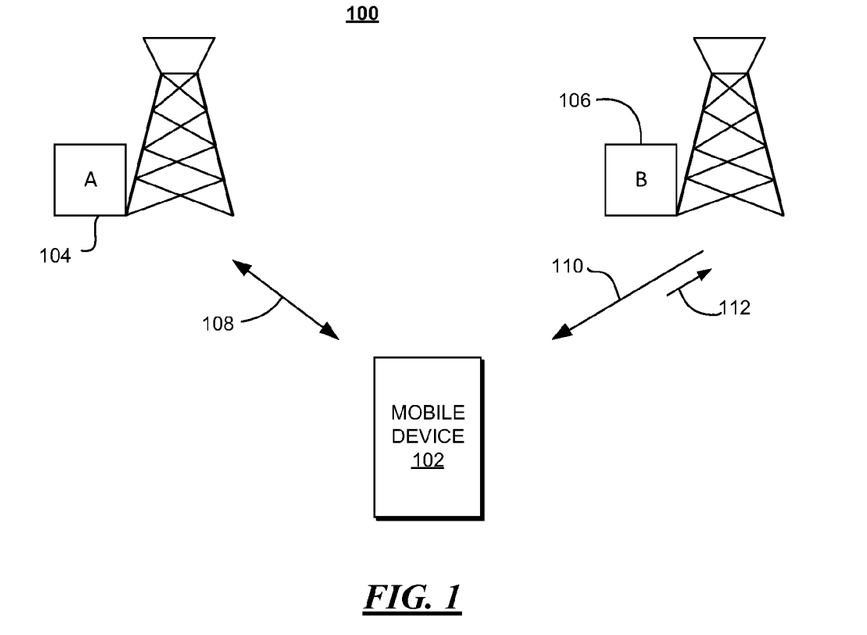
FIG. 1 is a system diagram of a mobile communication system including a mobile communication device configured to operate on more than one network simultaneously, in accordance with some embodiments.

FIG. 1 is a system diagram of a mobile communication system 100 including a mobile communication device 102 configured to operate on more than one mobile communication network simultaneously, in accordance with some embodiments. The mobile communication device 102 can be any of a number of communication devices, such as, for example, a cellular telephone, a two-way radio, a smartphone, and so on, and includes devices that combine the functionality of such devices. Generally, a mobile communication system uses radio base stations, such as base stations 104 and 106, to establish serving cells or areas in the vicinity of the base station. The serving cell operates an air interface that facilitates radio communication between the base station and mobile communication devices. The base stations 104, 106 can be base stations of a cellular telephony infrastructure network, a base station or repeater for a two-way radio network such as those operated by public safety and law enforcement organizations, or any other radio communication network. The air interface prescribes the radio frequencies, timing, modulation, access control, channel configuration, and other aspects of radio communication necessary to communicate with the base station. The base station is further connected to a network allowing communication among devices connected to the network and to terminals outside the network. Furthermore, as the mobile communication devices move from serving cell to serving cell, communication is handed off from one cell to the next to maintain continuity of communication, as is well known. The disclosed antenna arrangement can also be used with dissimilar non-mobile communication networks, or a mix of mobile and non-mobile communication networks.

The mobile communication device 102 can connect to both base stations 104, 106. The first base station 104 in the present example can be a base station of primary mobile communication network, and the second base station 106 can be a base station of a secondary mobile communication network. In some embodiments the user of the mobile communication device 102 can switch or change which network is the primary network and the secondary network. The mobile communication device 102 maintains a primary radio link 108 with the first base station 104 while the mobile communication network to which the first base station 104 belongs is the selected primary network. The mobile communication device 102 configures its antenna arrangement, as will be shown subsequently, so that the mobile communication device 102 transmits to the first base station 104 using a transmit antenna element, which is used for prolonged radio transmission activity. The mobile communication device 102 further maintains a secondary radio link with the second base station 106. With the secondary radio link the mobile communication device 102 receives transmissions 110 from the second base station 106 via a monitoring antenna element, and occasionally transmits beacon bursts 112 via the monitoring antenna element to maintain the link with the second base station. The air interfaces of the first and second base stations 104, 106 can be different. For example. The air interface of the first base station can be in accordance with the Long Term Evolution (LTE) standard developed by the $3^{rd}$ Generation Partnership Project (3GPP), which is in widespread use and well known, and is an Orthogonal Frequency Division Multiple Access (OFDMA) for downlink and Single Carrier Orthogonal Frequency Division Multiple Access (SC-OFDMA) protocols. The air interface of the second base station can be in accordance with the Evolution Data Optimized (EVDO—also known as Evolution Data Only) standard which is an evolution of the CDMA2000 (IS-2000) standard, developed by the 3GPP Project 2 (3GPP2).

Figure 2:
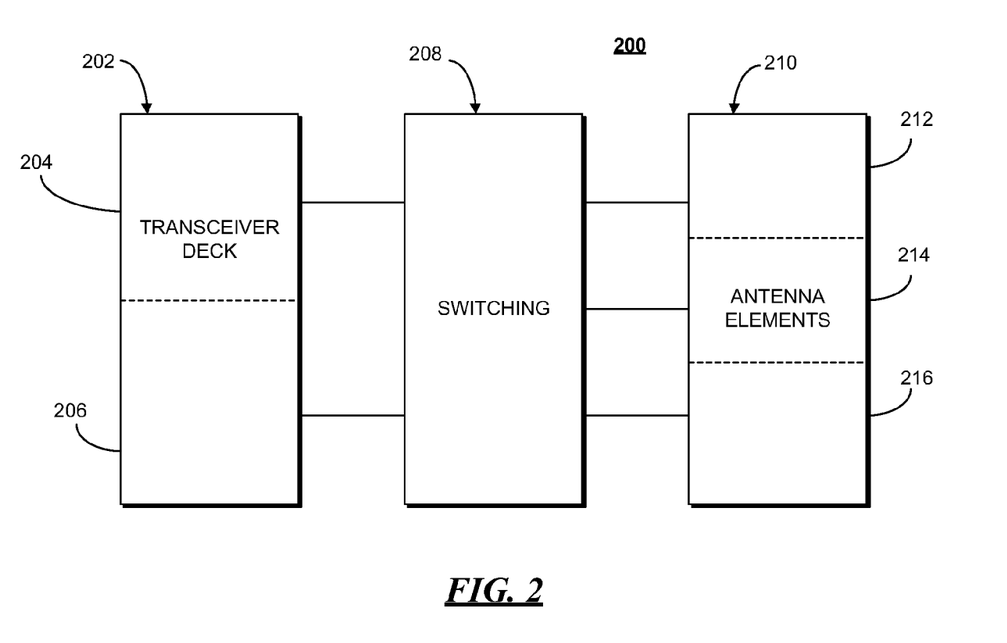
FIG. 2 is a block diagram of a communication device using an antenna arrangement in accordance with some embodiments.

FIG. 2 is a block diagram of a communication device using an antenna arrangement 200 in accordance with some embodiments. The antenna arrangement 200 can be incorporated into a mobile communication device, such as mobile communication device 102 of FIG. 1. The arrangement 200 includes a transceiver deck 202 that includes a first transceiver 204 and a second transceiver 206. Each of the transceivers 204, 206 are radio frequency transceivers and include processors, modulators, demodulators, frequency generation, amplification, and filtering, as known, to transmit and receive radio signals according to known air interface protocols. The first and second transceivers 204, 206 can operate according to different air interface protocols. Each of the transceivers 204, 206 are connected through a switching circuit 208 to several antenna elements 210. The antenna elements can include a transmission antenna element 212, a monitoring antenna element 214, and a diversity antenna element 216. The diversity antenna element can be coupled to both the transceivers 204, 206 for receive diversity at all times. The transmit antenna element 212 is coupled, via the switch circuit 208, to whichever transceiver 204, 206 is operating as the primary transceiver. The monitoring antenna element 214 can be coupled, via the switch circuit 208, to whichever of the transceivers 204, 206 is not the primary operating transceiver. The switching circuit 208 contains switch elements and other signal routing elements to facilitate the switching as described. The transmit antenna element 212 is used for ongoing communication operation, such as voice calls and other transmission intensive operations. Whichever transceiver 204, 206 is coupled to the transmit antenna element 212 can both transmit and receive signal via the transmit antenna element 212. The monitoring antenna element 214 is used to by the transceiver 204, 206 that is presently operating on the secondary air interface to receive signals from, and transmit beacons to the secondary communication network.

Typically each transceiver 204, 206 is operated by a software protocol stack which is designed to operate an independent transceiver. However, using the present arrangement, only one transceiver can engage in ongoing transmissions. Accordingly, the software protocol stacks must be modified to allow the switching circuit 208 to switch connections between the transceivers 204, 206, and the antenna elements 210, depending on which of the transceivers is presently selected to have primary transceiver operation.

Figure 3:
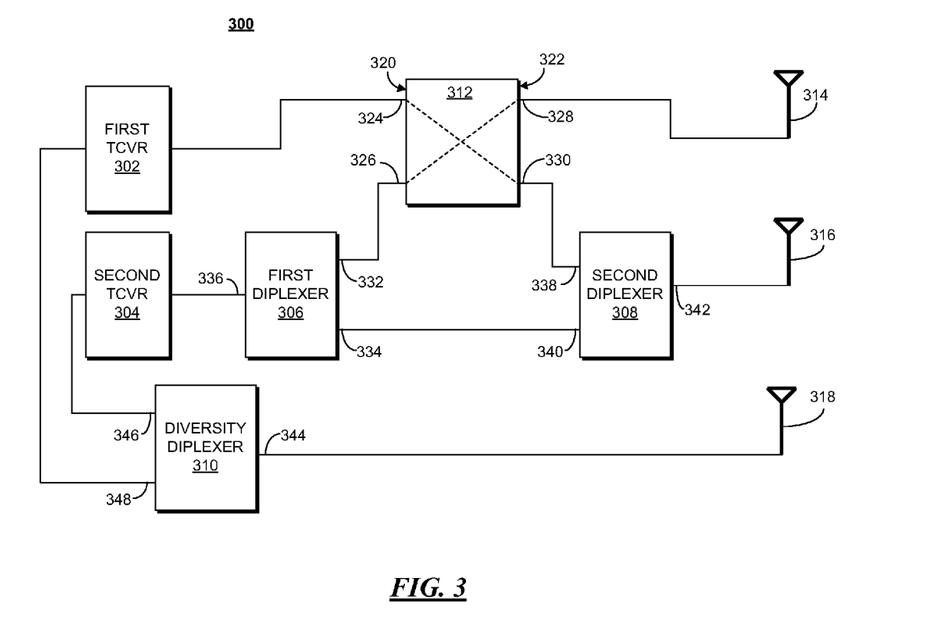
FIG. 3 is a block schematic diagram of an antenna arrangement configured in a first arrangement, in accordance with some embodiments.
Figure 4:
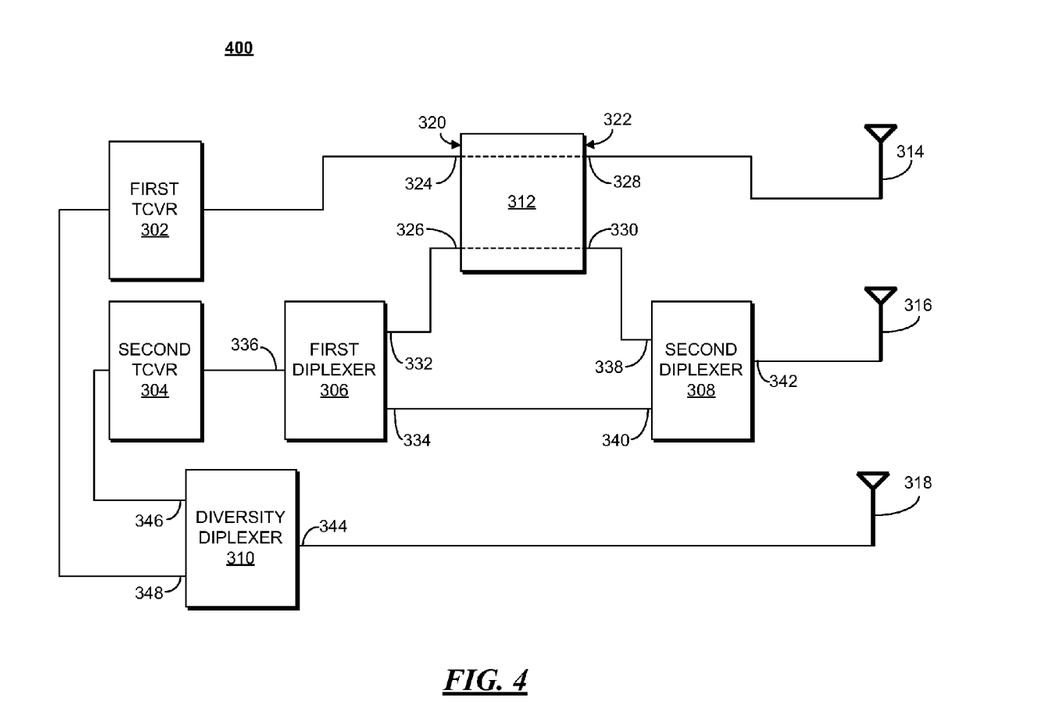
FIG. 4 is a block schematic diagram of an antenna arrangement configured in a second arrangement, in accordance with some embodiments.

FIGS. 3 and 4 are block schematic diagrams of an antenna arrangement switched in a first arrangement 300, and a second arrangement 400, respectively, in accordance with some embodiments. The circuit elements shown in FIGS. 3 and 4 correspond to the more general elements of FIG. 2. A first transceiver 302 and second transceiver 304 make up the transceiver deck. Each of the transceivers 302, 304 can be implemented separately, or with varying amounts of integration. The first transceiver 302 can be an LTE transceiver, operable on LTE BC13 and LTE BC14 frequency bands, and the second transceiver can be an EVDO transceiver, operable on the EVDO BC1 1900 MHz and BC0 850 MHz bands. A switching circuit is made up of a switch 312, a first diplexer 306, a second diplexer 308, and a diversity diplexer 310. The diplexers 306, 308, 310 are passive components that multiplex two or more disparate frequency bands. The switch 312 provides a double pole double throw functionality and has a transceiver side 320 and an antenna side 322. A transceiver side first port 324 is coupled to the first transceiver 302, and an antenna side first port 328 is coupled to a monitoring antenna element 314. The transceiver side second port 326 is coupled to the first diplexer low port 332, and the antenna side second port 330 is coupled to the second diplexer low port 338. The first diplexer high port 334 is coupled to the second diplexer high port 340. The first diplexer multiplex port 336 is coupled to the second transceiver 304, and the second diplexer multiplex port 342 is coupled to the transmit antenna element 316. The diversity diplexer 310 has a multiplex port 344 coupled to the diversity antenna element 318, and ports 346 and 348 coupled to the second and first transceivers 302, 304, respectively. Thus, the diversity antenna element 318 is always coupled to the first and second transceivers 302, 304 in the present example and is used by both transceivers for receive diversity.

In the first arrangement 300 of FIG. 3, the switch 312 is configured to connect the transceiver side second port 326 to the antenna side first port 322, and the transceiver side first port 324 to the antenna side second port 330. In the arrangement 300, when the first transceiver 302 is an LTE transceiver, the antenna arrangement is operable in an LTE mode and the LTE transceiver has primary transmit control. As used here, the term primary transmit control refers which transceiver is coupled to the transmit antenna element 316 and can transmit "at will" under control of the mobile communication device. Whichever transceiver does not have primary transmit control is inhibited from engaging in communication sessions, but can transmit beacons or other occasional control signals via the monitoring antenna element 314 so as to maintain a secondary communication link. In the first arrangement 300, the second transceiver 304 can be an EVDO transceiver and is the secondary transceiver when the switch 312 configured as shown in FIG. 3.

FIG. 4 shows a second arrangement 400 where the transceiver side first port 324 is connected to the antenna side first port 328 and the transceiver side second port 326 is connected to the antenna side second port 330. Thus, arrangement 400 is an example of the second transceiver 304 having primary transmit control and is coupled to the transmit antenna element 316. Accordingly, the first transceiver 302 is operating in the secondary mode and is coupled to the monitoring antenna element 314. As shown, the first transceiver 302 is inhibited from engaging in communication sessions, but can transmit beacons and other control signals via the monitoring antenna element 314.

Figure 5:
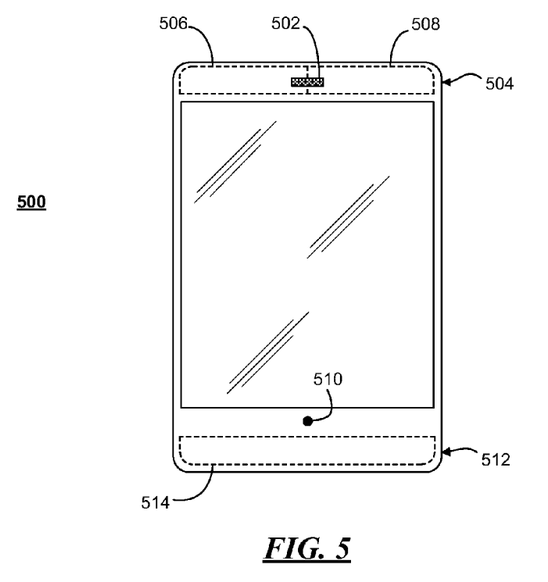
FIG. 5 is a mobile communication device incorporating an antenna arrangement configured in accordance with some embodiments.

FIG. 5 is a mobile communication device 500 incorporating an antenna arrangement configured in accordance with some embodiments. The device 500 shown has a monolithic form factor and has an earpiece 502 at an earpiece end 504 of the device 500, and a microphone 510 at a mouthpiece end 512 of the device 500. When the device is held to a user's head for communication, the earpiece 502 will be located proximate to the user's ear, and the microphone 510 will be located closer to the user's mouth. The device 500 includes a monitoring antenna element 506 and a diversity antenna element 508 (both shown internal to the device 500) that are both disposed at the earpiece end 504 of the device 500. The device further has a transmit antenna element 514 at the mouthpiece end 512. By locating the transmit antenna element 514 at the mouthpiece end 512 the transmit antenna element 514 is located in such a way as to minimize SAR. The antenna elements 506, 508, and 510 are shown here as internal or hidden antenna elements, but they could equivalently be external antenna elements or a mix of internal and external antenna elements. The antenna elements can be designed to be multi-resonant so that they are effective in multiple frequency bands.

Figure 6:
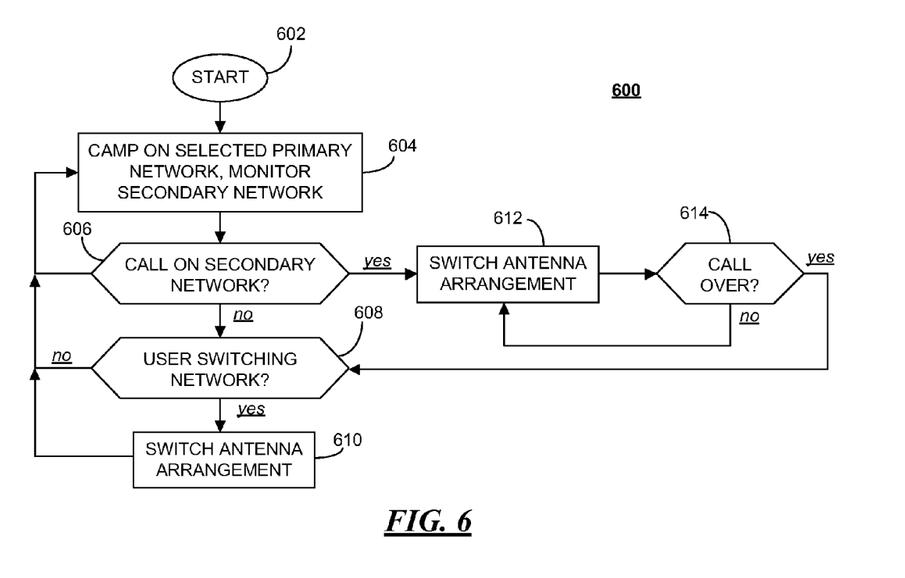
FIG. 6 is a flowchart diagram of a method of operating an antenna arrangement in accordance with some embodiments.

FIG. 6 is a flowchart diagram of a method 600 of operating an antenna arrangement in accordance with some embodiments. The present method is meant to be exemplary only, and numerous variations within the scope of the present disclosure will occur to those skilled in the art. At the start 602 a mobile communication device containing an antenna arrangement as illustrated in any of FIGS. 2-5 is powered up and ready to operate. The device will first determine which transceiver has primary transmit control and will camp on the corresponding network (604). As used here, the term "camp" refers to registering with the network and is available for immediate communication service. Accordingly, the switch circuit, such as switch circuit 208, is set to connect the transceiver having primary transmit control to the transmit antenna element, and the transceiver not having primary transmit control is connected to the monitoring antenna element. The transceiver connected to the monitoring antenna element can maintain a secondary communication link but is inhibited from engaging in communication sessions. While camped on the first communication system, the transceiver not having primary transmit control monitors for communication activity such as call alerts (606). The device can also determine if the user has decided to switch which transceiver has primary transmit control (608). While no calls or other significant communication activity is occurring on the secondary communication link, and the user has not switched which transceiver has primary transmit control, the device will remain camped as in box 604 and continue to monitor for events which necessitate switching which transceiver has primary transmit control through boxes 606, 608.

While camped on a selected network, and upon receiving a communication initiation event on the secondary communication link (box 606), the device can switch the antenna arrangement, as in box 612, so that the transceiver which initially did not have primary transmit control will then have primary transmit control. For example, the device can cause switch 312 to change from the configuration of FIG. 3 to the configuration of FIG. 4. The change can be temporary to accommodate the communication activity as needed, thus the method determines if the communication activity has ended as in box 614. While the communication continues, the method simply loops between boxes 612, 614. Upon the communication ending, as determined at box 614, the method can automatically revert the antenna arrangement back to the original configuration, or it can allow the user to determine whether to stay in the present arrangement or revert back to the original arrangement, as indicated by boxes 608, 610.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Any published standards or other well-established industry practices referred to herein include only the teachings and information contained in and/or described by such publications as of the time of filing the present application.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented, at least in part, as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An antenna arrangement, comprising:
    first and second transceivers each configured to operate according to different first and second air interfaces, respectively, wherein only one of the first and second transceivers can have primary transmit control at a time;
    a diversity antenna element coupled to both the first and second transceivers;
    a transmit antenna element;
    a monitoring antenna element;
    a switching circuit that selectively couples the first and second transceivers to the transmit antenna element and the monitoring antenna element according to:
        when the first transceiver has primary transmit control the switching circuit couples the first transceiver to the transmit antenna and the second transceiver to the monitoring antenna;
        when the second transceiver has primary transmit control the switching circuit couples the second transceiver to the transmit antenna and the first transceiver to the monitoring antenna;
    wherein the switching circuit comprises:
        a switch having a double pole double throw configuration, a transceiver side and an antenna side, and a first port and a second port at each of the transceiver and antenna sides;
        a first diplexer and a second diplexer each having a low, high, and multiplexed port;
        the first port of the transceiver side of the switch coupled to the first transceiver, the first port of the antenna side of the switch coupled to the monitoring antenna element;
        the multiplexed port of the first diplexer coupled to the second transceiver, the low port of the first diplexer coupled to the second port of the transceiver side of the switch, and the high port of the first diplexer coupled to the high port of the second diplexer; and
        the multiplexed port of the second diplexer coupled to the transmit antenna element, and the low port of the second diplexer coupled to the second port of the antenna side of the switch.

2. The antenna arrangement of claim 1, wherein the antenna arrangement is disposed in a mobile handheld communication device having an earpiece end and a mouthpiece end, the diversity antenna element and the monitoring antenna element are located at the earpiece end and the transmit antenna element is located at the mouthpiece end.

3. The antenna arrangement of claim 1 wherein the switching circuit allows whichever of the first and second transceivers that does not have primary transmit control to transmit monitoring beacons via the monitoring antenna element.

4. The antenna arrangement of claim 1, wherein the first transceiver operates using a Single Carrier Orthogonal Frequency Division Multiple Access (SC-OFDMA) protocol.

5. The antenna arrangement of claim 1, wherein the second transceiver operates using a code division multiple access protocol.

6. The antenna arrangement of claim 1, wherein the diversity antenna element is coupled to a multiplexed port of a diversity diplexer, a first diplexer port of the diversity diplexer is coupled to the first transceiver, and a second diplexer port of the diversity diplexer is coupled to the second transceiver.

7. A mobile communication device, comprising:
    first and second transceivers each configured to operate according to different first and second air interfaces, respectively, wherein only one of the first and second transceivers can have primary transmit control at a time;
    a diversity antenna element coupled to both the first and second transceivers; and
    a switching circuit that selectively couples the first and second transceivers to a transmit antenna element and a monitoring antenna element such that when the first transceiver has primary transmit control the switching circuit couples the first transceiver to the transmit antenna element and the second transceiver to the monitoring antenna element, and when the second transceiver has primary transmit control the switching circuit couples the second transceiver to the transmit antenna element and the first transceiver to the monitoring antenna element;
    wherein the switching circuit comprises:
        a switch having a double pole double throw configuration, a transceiver side and an antenna side, and a first port and a second port at each of the transceiver and antenna sides;
        a first diplexer and a second diplexer each having a low, high, and multiplexed port;

the first port of the transceiver side of the switch coupled to the first transceiver, the first port of the antenna side of the switch coupled to the monitoring antenna element;

the multiplexed port of the first diplexer coupled to the second transceiver, the low port of the first diplexer coupled to the second port of the transceiver side of the switch, and the high port of the first diplexer coupled to the high port of the second diplexer; and the multiplexed port of the second diplexer coupled to the transmit antenna element, and the low port of the second diplexer coupled to the second port of the antenna side of the switch.

8. The mobile communication device of claim 7, wherein the mobile communication device includes an earpiece end and a mouthpiece end, the monitoring antenna element is located at the earpiece end, and the transmit antenna element is located at the mouthpiece end, the mobile communication device further includes a diversity antenna element coupled to both the first and second transceivers and located at the earpiece end.

9. The mobile communication device of claim 7 wherein the switching circuit allows whichever of the first and second transceivers that does not have primary transmit control to transmit monitoring beacons via the monitoring antenna element.

10. The mobile communication device of claim 7, wherein the first transceiver operates using a Single Carrier Orthogonal Frequency Division Multiple Access (SC-OFDMA) protocol.

11. The mobile communication device of claim 7, wherein the second transceiver operates using a code division multiple access protocol.

12. The mobile communication device of claim 7 further comprising a diversity antenna element that is coupled to a multiplexed port of a diversity diplexer, a first diplexer port of the diversity diplexer is coupled to the first transceiver and a second diplexer port of the diversity diplexer is coupled to the second transceiver.

* * * * *